United States Patent
Grieu et al.

(10) Patent No.: US 6,745,935 B1
(45) Date of Patent: Jun. 8, 2004

(54) METHOD FOR EXCHANGING DATA BETWEEN AN AUTOMATIC DISPENSER AND A MICROCIRCUIT CARD

(75) Inventors: François Grieu, Paris (FR); Grégory Mardinian, Montmorency (FR)

(73) Assignee: Regie Autonome des Transports Parisiens, Paris (FR)

( * ) Notice: Subject to any disclaimer, the term of this patent is extended or adjusted under 35 U.S.C. 154(b) by 0 days.

(21) Appl. No.: 09/806,907

(22) PCT Filed: Oct. 13, 1999

(86) PCT No.: PCT/FR99/02470

§ 371 (c)(1),
(2), (4) Date: Apr. 6, 2001

(87) PCT Pub. No.: WO00/22583

PCT Pub. Date: Apr. 20, 2000

(30) Foreign Application Priority Data

Oct. 13, 1998 (FR) ............................................ 98 12770

(51) Int. Cl.⁷ ................................................. G06F 7/00
(52) U.S. Cl. ...................... 235/376; 235/375; 235/382; 235/382.5; 235/383; 705/64; 705/75
(58) Field of Search ................................ 235/376, 382, 235/382.5, 375, 380, 379, 381, 486, 492; 705/64, 66; 902/1, 2, 37, 38

(56) References Cited

U.S. PATENT DOCUMENTS

| 5,635,695 | A | * | 6/1997 | Feiken ......................... 235/380 |
|---|---|---|---|---|
| 5,715,431 | A | | 2/1998 | Everett et al. |
| 5,982,293 | A | * | 11/1999 | Everett et al. ................ 340/5.4 |
| 6,062,472 | A | * | 5/2000 | Cheung ........................ 235/379 |
| 6,070,795 | A | * | 6/2000 | Feiken ......................... 235/375 |

FOREIGN PATENT DOCUMENTS

| EP | 0 482 975 | 4/1992 |
|---|---|---|
| EP | 0 563 997 | 10/1993 |
| EP | 0 831 433 | 3/1998 |
| FR | 2 689 662 | 10/1993 |
| FR | 2 757 978 | 7/1998 |
| JP | 58019978 A | * 2/1983 |

* cited by examiner

*Primary Examiner*—Michael G. Lee
*Assistant Examiner*—Ahshik Kim
(74) *Attorney, Agent, or Firm*—Nixon & Vanderhye P.C.

(57) ABSTRACT

The card contains value information suitable for being debited by the machine in consideration for delivering goods or service. The machine causes a ratification flag stored in the non-volatile memory of the card to be modified between two states, namely: a ratified state corresponding to the case where the preceding transaction performed with the card, whether with the same machine or with another machine, took place correctly, and a non-ratified state for the case when said preceding transaction was interrupted in the course of being executed. The machine successively: conditionally debits the card if the flag is in the ratified state; causes the card to put the flag in the non-ratified state if a debit took place in the preceding step; then causes the goods or service to be delivered; and if delivery takes place effectively in the preceding step, causes the flag to be put by the card into the ratified state.

14 Claims, No Drawings

METHOD FOR EXCHANGING DATA BETWEEN AN AUTOMATIC DISPENSER AND A MICROCIRCUIT CARD

BACKGROUND OF THE INVENTION

1. Field of the Invention

The present invention relates to automatic transaction systems that deliver goods or service by means of a machine exchanging information with a portable object which is debited by a given amount or value in consideration for the delivery of goods or service.

2. Discussion of Prior Art

The machine can be an automatic dispenser, e.g. for dispensing confectionery or drinks, or it can be a device for providing a service, for example controlled access implemented by opening a turnstile so as to give a traveller access to a transport system. Below, the term "delivery of goods" is sometimes used for short, but it should be understood that the invention naturally covers a much wider range of applications, including the delivery of all sorts of services.

In the same manner, although the portable object considered by way of example is a microcircuit card, the invention can also be applied to other types of portable object, such as magnetic cards or travel tickets, e.g. in the form of a magnetic coupon or the like. Nevertheless, it is preferred to use a microcircuit card, given the very high degree of security and reliability that is made possible thereby.

Goods or service is delivered as the result of implementing a transaction during which the card is temporarily coupled to the machine to enable information to be exchanged between the card and the machine, with payment being performed at least in part by modifying information stored in the memory of the card, which information is representative of the value contained in the card.

Coupling can be achieved between the card and the machine in various known ways, with or without metallic contact, and it is shown that the invention applies most advantageously to coupling of the so-called "contactless" type. With that type of coupling, there exists a non-negligible risk of communication between the card and the machine being interrupted in unexpected manner, e.g. because the card has moved out of the range of the machine before processing had been completed, or because of some temporary disturbance, e.g. the passage of a mass of metal close by, or indeed because the user passes the card too quickly in front of the machine to enable information to be interchanged in satisfactory manner.

The event that interrupts a transaction can equally well be accidental or deliberate, for example the user might deliberately seek to obtain delivery while nevertheless preventing the corresponding amount from being debited from the card.

In the context of an automatic transaction system of the kind described above, one of the objects of the invention is to associate payment (i.e. debiting of the card) with delivery in such a manner as to preserve not only the interests of the purchaser (user) but also those of the vendor (the operator of the machine), even if an event should interrupt the transaction or prevent payment being achieved.

Until now, the problem has usually been dealt with in one of the following ways:

- no action is taken technically, so the event has to be dealt with by some human procedure;
- the card is temporarily prevented from being withdrawn by the user, and the machine debits the card if and only if the goods or service is indeed delivered (this applies for example to machines in which the card is hidden by a flap or is "swallowed" while the transaction is taking place); and
- the card remains accessible to the purchaser: this avoids the need to provide an expensive mechanism which slows down the transaction and is in any event inapplicable to transactions that take place without contact. However special precautions then need to be taken.

The third situation, in which the card remains physically accessible to the user leads to one or other of the following situations:

- debiting takes place after delivery: the purchaser can attempt to prevent debiting, e.g. by withdrawing the card immediately after delivery or by making debiting impossible in some other way (e.g. by insulating one of the contact areas of the card's microcircuit by means of a piece of adhesive); this can be acceptable if delivery is intrinsically spread out in time, for example a telephone call, in which case the advantage gained by such fraud is highly limited; however it is unsatisfactory if the machine delivers an article or opens a turnstile; and
- debit takes place prior to delivery: under such circumstances, there is a risk of the purchaser being out-of-pocket because payment has taken place by information being interchanged over a communications channel that can be interrupted by the card being extracted or moving too far away; in other words it is possible that the card is debited but that the machine does not deliver goods or service since the debit is not confirmed.

The invention lies in the general context corresponding to the last-mentioned situation above, i.e. the situation in which the card is debited prior to delivery.

In the most general terms, a transaction takes place as follows:

10) the machine causes the card to be debited;
20) the card modifies its monetary value information (or some equivalent value in terms of "tokens");
30) the card confirms to the machine that debiting has indeed taken place, i.e. that the monetary value in its memory has indeed been modified; and
40) the machine delivers the goods or service.

As will readily be understood, if the interchange between the card and the machine happens to be interrupted during step 30, then the purchaser will be out-of-pocket.

To mitigate that drawback, various practices have been used in the past:

- if the purchaser withdraws the card in the middle of a transaction, it is the purchaser who is considered as being at fault and it is the purchaser who is liable to be penalized; in the event of the purchaser making a complaint, more-or-less arbitrary procedures are provided for indemnifying the user or for establishing means for determining after the event whether the transaction recorded in the card was indeed followed by delivery by the machine;
- the purchaser is debited in small amounts only while delivery is taking place, so if the purchaser is indeed out-of-pocket, then the amount involved will be small and can be accepted: that solution is entirely suitable for delivering fluids or telephone calls, but it is impractical for delivering articles or for giving access to a transport network; and
- a system is provided such that if the current transaction is interrupted with prejudice to the purchaser, then in a subsequent "resumption" transaction, the goods or service can indeed be delivered, but without any further payment, i.e. without debiting the card again.

This third solution is a known practice as used for example in electronic purses complying with the draft European standard EN 1546.

In such known circumstances, if payment has taken place, and if the user who has not obtained delivery restarts the transaction on the same machine, and if the new transaction (resumed transaction) is carried through successfully, then goods or service will indeed be delivered for fair payment.

Known systems for implementing a resumption transaction nevertheless share the following drawback.

If communication between the machine and the card is interrupted during above step 30, and if the user does not re-establish the link between the card and the same machine, then the user will be out-of-pocket.

In particular, when a plurality of machines exist close together for delivering identical goods or service (for example a row of turnstiles giving access to a transport network), a client who has passed a contactless card rather too fast and who finds that the turnstile has not opened, will often try again at an adjacent turnstile, i.e. using a machine other than the machine on which the initial transaction was begun. The second machine will debit the client even if the first machine has already made the same debit, such that the purchaser will be debited twice for single delivery of the same goods or service (one opening of the turnstile).

It is possible to mitigate that drawback by interconnecting machines in the same zone by means of a network enabling information suitable for resuming a transaction to be interchanged, e.g. a card identity number, the number of the last machine to have ordered a debit, the corresponding transaction number for that machine, etc. thus making it possible for the transaction to be resumed on any of the machines in the network.

The use of such a network suffers from two drawbacks, in particular:

the need for a network, with its associated hardware and software constraints; and the fact that each machine must interrogate the network on every occasion prior to instructing the debiting of a card (step 10 above), thereby slowing down the transaction, or else each machine must store locally all of the information relating to transactions that have not terminated and that have taken place (at least recently) on the other machines in the network, and it must be capable of searching quickly to determine whether the card it is about to debit coincides with one such non-terminated transaction.

SUMMARY OF THE INVENTION

The invention proposes a solution to the above problem which avoids or minimizes the need to use a network, and which has characteristics that enable it to satisfy very severe constraints, such as those associated with a contactless card in transport situations, where each transaction:

must take place quickly (about 0.1 seconds);

can easily be interrupted without the user being at fault (card handled too fast or not accurately enough);

can implement a plurality of payment points (a plurality of turnstiles) between which the purchaser can move quickly (e.g. 1 or 2 seconds to go from one turnstile to the next); and must be capable of operating satisfactory in the event of a breakdown of any one of its elements, in particular the network interconnecting the machines, supposing that such a network is implemented.

To this end, the invention provides a method of interchanging data between the non-volatile memory of a portable object, in particular a microcircuit card, and an automatic machine with which the card is temporarily coupled to enable goods or service to be delivered, the card having value information that can be debited by the machine in consideration for delivering the goods or service, the method being characterized in that it comprises steps in which the machine causes a ratification flag to be modified, which flag is stored in the non-volatile memory of the card, said flag having two states, a ratified state corresponding to the case in which the preceding transaction performed with the card, whether by the same machine or another machine, took place correctly, and a non-ratified state for the case in which said preceding transaction was interrupted while it was being executed, and in which the machine successively: conditionally debits the card if the flag is in the ratified state; causes the card to put the flag into the non-ratified state if a debit took place during the preceding step; then causes the goods or service to be delivered; and if delivery takes place effectively in the preceding step, causes the card to put the flag into the ratified state.

DETAILED DISCUSSION OF EMBODIMENTS

The method may include the following steps in particular: a) the machine reads the state of the ratification flag and jumps to step e) if it is in the non-ratified state; b) the machine causes the card to be debited by an amount corresponding to the goods or service to be delivered; c) the card records the debit by updating its value information, and it puts the flag into the non-ratified state; d) the card confirms to the machine that the debit has been recorded; e) the machine delivers the goods or service; f) the machine causes the flag to be set to the ratified state; and g) the card changes the state of the flag to put it into the ratified state.

According to various advantageous subsidiary characteristics:

conditional debiting of the card is also subordinate to a time delay elapsing since the preceding operation of putting the flag into the non-ratified state and/or to the machine performing the current transaction belonging to a group to which the machine that performed the preceding transaction also belongs;

when the flag is in the non-ratified state, delivery without debit is inhibited if the machine detects that delivery took place during the preceding use of the card;

card debiting and putting the flag into the non-ratified state are performed in indivisible manner;

at least a portion of the information modifying the state of the card, in particular commands enabling the flag to be put into the ratified state, and/or at least a portion of the information relating to the state of the card, in particular the state of the flag and confirmation that the debit has taken into account, is previously processed by cryptographic means implemented both in the card and in the machine;

the goods or service is delivered in deferred manner after a given time delay; in which case, provision can advantageously be made for delivery to take place prior to the time delay expiring in the event that it is confirmed that the card has properly executed the step of putting the flag into the ratified state; and/or, also by inserting a pause of random duration in the transaction;

the information interchanged between the machine and the card is enciphered in such a manner as to avoid revealing the moment at which the machine instructs the card to put the flag into the ratified state, or the moment at which the card performs that instruction;

counting is provided in the machine to determine the number of occasions on which it reads a flag in the non-ratified state;

counting is provided in the card to determine the number of occasions on which it stores the flag in the non-ratified state between two transactions, it being possible in particular to provide means for indicating that a given count threshold in the card has been exceeded, in particular means for inhibiting consecutive delivery of goods or service; and the card memory includes information about the kind of goods or service to be delivered, which information is updated before any delivery of said goods or service.

Other characteristics and advantages appear from the following description of an example implementation of the invention.

EXAMPLE

The description beings by explaining how a prior art system with a resumption transaction is constituted (this system is close in particular to the draft standard EN 1546 for the electronic purse, but it is transposable to a large number of other applications).

In its memory, each card possesses:

a) a card identity number which is invariable and characteristic of the card;

b) the number of the last automatic machine to have caused a debit operation to be performed in the card;

c) the number of that transaction for that machine; and d) the value of the card, i.e. the monetary amount or its equivalent in tokens, which is the data item on which debiting is performed.

Each machine possesses in its own memory:

A) the number of the last card in which it preformed a debit operation;

B) a machine identity number that is invariable and characteristic; and

C) a transaction number which is incremented by the machine on each transaction.

A transaction essentially comprises the following steps:

05) the machine reads data items a, b, and c from the card and determines whether a=A, b=B, and c=C; in the affirmative, it goes directly to step 40;

10) the machine causes the amount D corresponding to the goods that are to be delivered to be debited from the card, and also causes the following to be written in the card: a=A, b=B, and c=C;

20) the card records the debit, i.e. it replaces d by (d-D) and a, d, and c by the values communicated to it, i.e. A, B, and C;

30) the card confirms to the machine that the debit has been recorded; and 40) the machine delivers the goods and replaces C by C+1.

Naturally, the transaction includes steps associated with establishing, running, and terminating communication between the machine and the card, steps for booking the sums collected by the machine, and steps for generating and verifying the cryptographic certificates required for ensuring that the values interchanged are authentic. These steps which are themselves known are not involved in implementing the invention (unless otherwise stated) and are not described in greater detail.

Steps are also provided for handling the case where the value in the card is insufficient, with processing adapted to stop operation: for example, the value of the card is read initially by the machine, is compared with the amount of the transaction, and step 10 is inhibited if there is not sufficient credit; in a variant or in addition, it is also possible to provide for the card to perform the same check and to inhibit steps 20 and 30.

The various operations performed in step 20 are advantageously performed in indivisible manner, i.e. provision is made in the card for means such that if step 20 is interrupted, then any subsequent read will find data items a, b, c, and d either all unchanged, or else all changed under the control of the machine, but under no circumstances will only some of them have been modified.

As mentioned above, in the event of communication between the machine and the card being interrupted during step 40, if the user tries again on a machine that is not the same machine as the machine on which the initial transaction was interrupted, then the second machine will debit the card even if the card has already been debited by the first machine. The purchaser will thus be debited twice for a single item, and will therefore be out-of-pocket because of the resumed transaction.

To mitigate that difficulty, and to provide an acceptable compromise between ensuring that the purchaser is not out-of-pocket and protecting against fraud, the invention essentially provides for a bit $\Re$ in the memory of the card, which bit is referred to as a "ratification bit" and can take the following two states (it being understood that the functions performed by the values 0 and 1 could be interchanged):

State 0 ("ratified"): this is the normal case, the user's previous transaction took place properly, so the machine will subsequently deliver the goods and debit the card;

State 1 ("not ratified"): the preceding transaction did not terminate correctly (the goods were not delivered), so the goods should be delivered subsequently without debiting the card.

If it is appropriate to debit the card, the flag is put into state 1 by the machine prior to delivering the goods, and if the goods are subsequently delivered, then the machine causes $\Re$ to be put into state 0. More precisely, the transaction comprises the following steps:

05) the machine reads the state of $\Re$ in the card; if it is in state 1, then the machine goes directly to step 40;

10) the machine causes the amount D corresponding to the goods to be delivered to be debited from the card;

20) the card records the debit, i.e. it replaces the balance d by (d-D) and it puts $\Re$ into state 1;

30) the card confirms to the machine that the debit has been recorded;

40) the machine, on receiving the confirmation in step 30, or via the test in step 05, delivers the goods;

45) the machine causes $\Re$ to be put into state 0; and 50) the card modifies the state of $\Re$, which goes to state 0.

As can be seen, the debit operation is performed in steps 10, 20, and 30.

In the particular case where units are debited, D=1, and that can then be implicit; another special case is that of single use, corresponding to d=1 and then d=0, d being suitable for being reduced by one bit only.

It will be observed that the purchaser is never out-of-pocket in the event of making an attempt to perform the same transaction on another machine when the goods have not been delivered by the first (a fortiori if the attempt is made on the same machine), and this takes place in characteristic manner without any need to set up a network between the machines.

Various improvements of the above-described method are described below.

Some of the improvements relate specifically to reducing the probability of a situation in which steps 05 to 45 take place normally, but the transaction is interrupted immediately after step 45, which prevents step 50 from being performed.

Under such circumstances, the purchaser to whom the machine has delivered the goods (step 40) is in a position to receive the goods again in a new transaction without being debited a second time. It is therefore in the interest of the user to prevent step 50 being performed, e.g. by deliberating passing the card quickly past the machine so as to be able to interrupt the transaction immediately after step 45 has been executed.

A first improvement consists in step 05 in going to step 40 (second alternative branch after testing the state of $\Re$) only if conditions are satisfied other than merely $\Re$ equals 1, and in particular conditions based on the time that has elapsed since $\Re$ was set to 1 and/or the identity of the machine that had previously set the flag.

For this purpose, information is associated in the card with the flag, this information being characteristic of the time and/or the nature of the machine which performed the previous debit (and/or caused the flag to be set) in a preceding transaction. This information is advantageously written during step 20 (in the same manner as in step 20 of a prior art transaction, as described above).

The information stored in the card is compared with corresponding information characteristic of the current time and/or of the nature of the machine which is getting ready to deliver the goods.

By way of example, in an application to transport, the effect of this improvement is to enable a transaction to be resumed with the purchaser receiving undue advantage only if the preceding operation began to take place on the same set of payment locations and a length of time ago that is short enough to exclude re-use for a new trip. With this precaution, a traveller cannot make two trips for the price of one, and the possible opening of a turnstile for a second traveller (representing the non-ratified ticket of the first traveller) does not harm the transport supplier any more than does forced passage through a turnstile, insofar as in any event one of the travellers will be found to have not paid if ever there is an inspection.

A second improvement consists in step 05 in inhibiting passage to step 40 (second alternative branch after testing the state of $\Re$) if the machine has previously performed a transaction on the same card that was completed all the way to proper execution of delivery. This improvement has the effect of requiring the purchaser in any event to change machine before having any hope of obtaining double delivery.

The machine performs this detection, for example by consulting a history of the transactions that it has carried out, including for each transaction a card identifier and an indication as to whether or not delivery took place; the history can be shared between a set of machines if they are interconnected by a communications network (note: in an application to paying for transport, a failure in this network gives rise only to a slight increase in the probability of a ticket being usable via a second turnstile).

Inhibition of free payment can give rise either to the transaction being stopped (as happens in transport in the event of a second use within the time limit specified in the above first improvement), or else by a second delivery but in return for further payment (for example when an article of goods is delivered).

A third improvement consists, in step 20, in making the debit and in modifying the flag $\Re$ (and where appropriate writing the information associated with the above-described first improvement) in such a manner that these operations are indivisible.

In other words, means are provided in the card which ensure that if step 20 is interrupted, then any subsequent read will obtain $\Re$ and d information (and where appropriate any information associated with the first improvement) that is either completely unchanged, or else completely changed, in compliance with the commands of the machine.

This avoids certain possible kinds of error in favor of the purchaser or of the machine depending on which operations take place without the other.

By way of example (suitable for minimizing the number of writes in memory), the card can have two memory zones $Z_0$ and $Z_1$ each containing $\Re_i$, the balance $d_i$, a number $n_i$ that can take the value 0 or 1, and a check sum $s_i$ relating to $d_i$ and $n_i$ ($s_i$ is normally the number of 0 bits in $d_i$ and $n_i$).

Prior to a read (in particular in step 05), the card determines which of the zones $Z_0$ or $Z_1$ is valid, and for this purpose it checks the validity of $s_i$ relative to $d_i$ and $n_i$ in each of the two zones. If $s_i$ is invalid, then the card ignores or deletes the entire zone; if at the end of this operation only one of the two zones is not ignored or deleted, then this zone is considered as being valid; if both zones are not ignored or deleted, then the valid zone is given by the following table:

| $n_0$ | $n_1$ | valid zone |
|---|---|---|
| 0 | 0 | $Z_1$ |
| 1 | 0 | $Z_0$ |
| 1 | 1 | $Z_1$ |
| 0 | 1 | $Z_0$ |

The values returned by the card for $\Re$ (in step 10) and d (taken into account for calculating the new balance in step 20) are $\Re_i$ and $d_i$ in the valid zone.

Writing (steps 20 and 50) will take place in the other zone (after it has previously been deleted), using a value of $n_i$ such that the zone in which writing takes place becomes the valid zone, i.e. in accordance with the following table:

| if zone valid | and | write in | and |
|---|---|---|---|
| $Z_1$ | $n_1 = 0$ | $Z_0$ | $n_0 = 1$ |
| $Z_0$ | $n_0 = 1$ | $Z_1$ | $n_1 = 1$ |
| $Z_1$ | $n_1 = 1$ | $Z_0$ | $n_0 = 0$ |
| $Z_0$ | $n_0 = 0$ | $Z_1$ | $n_1 = 0$ |

Writing takes place in this zone during step 20 with $\Re_i=1$, before or simultaneously with writing of $n_i$, $d_i$, and $s_i$; at the end of this writing, the zone which is valid has changed.

Step 50 writes $\Re_i=0$ in the valid zone.

Indivisible writing of other information can be treated by extending zones $Z_i$ and data taken into account by the check sums $s_i$.

A fourth improvement consists in subjecting the information that modifies the state of the card, in particular the commands that enable the ratification flag to be set to state 1, to prior verification by means of a device integrated in the card, concerning the validity of a cryptographic certificate integrated in the message and produced in the machine by corresponding means.

A fifth improvement consists, symmetrically to the preceding improvement, in subjecting information relating to the state of the card, in particular the state of the ratification flag and/or confirmation that the debit has been taken into account to prior verification by a device integrated in the machine, concerning the validity of a message integrity cryptographic certificate as produced in the card by corresponding means.

By way of example, the cryptographic certificate of the fourth and fifth improvements described above can be an electronic message signature as obtained and verified using the method of international standard ISO 9726-2, or more simply using a symmetrical DES type algorithm.

Various other improvements seek to make it more difficult for a user deliberately to interrupt a transaction.

A sixth improvement thus consists in modifying step 40 by replacing pure and simple delivery of the goods by taking a decision as to whether or not to deliver the goods after a time delay has elapsed. To improve the speed of the system, the goods can be delivered before the time delay has expired if the machine receives confirmation that step 50 has been performed properly, rather than waiting for the time delay to expire. These precautions serve to prevent possible attempts by the purchaser at preventing step 50 by interrupting communication immediately after delivery. The sequence is modified as follows (given that steps 40 and 45 can be interchanged):

40) the machine starts a time delay;

45) step unchanged;

50) step unchanged;

55) the card acknowledges execution of step 50 by issuing a special message (optional step suitable for shortening the average duration of a transaction); and 60) the machine delivers the goods when the time delay expires, or where appropriate, on receiving the message of step 55, at the end of the first of the two terms to elapse. The user is thus deprived of a time marker that might make it possible to interrupt the transaction to the user's advantage.

A seventh improvement consists in providing protection against eavesdropping communications between the machine and the card by means such as cryptographic enciphering, so that such eavesdropping cannot reveal the instant at which the command is given to reset the ratification bit $\Re$ to 0 or the instant at which it is indeed reset. This makes it more difficult to determine the instant at which it would be advantageous to interrupt communication.

An eighth improvement consists, in addition to the sixth and/or seventh improvements described above, in inserting a randomly-varying pause in the transaction, still for the purpose of making it difficult to determine the instant at which it would be advantageous to interrupt communication. This randomly-varying pause is preferably inserted in a step situated prior to the card being debited.

A ninth improvement consists in detecting a situation that is very likely to be abnormal, as revealed by too large a number of free transactions. To this end, an appropriate counter device counts cases in which a decision is made in step 05 to perform delivery without payment. It is also possible to sum the amounts that have thus possibly been lost by the machines. If the counter is integrated in the machine, it can be used for statistical purposes; if it is integrated in the card, it is advantageous to make delivery of the goods or service subordinate to confirmation that the counter has indeed been updated in the event of the purchaser not being debited, so that the purchaser at least cannot escape from the counter being updated.

It is possible to provide a device that inhibits delivery of the goods when the counter exceeds a threshold, or indeed that issues an alarm or some analogous signal. It is also possible to provide for the counter to be reset to zero or to be reduced in part only, e.g. on each transaction that is indeed debited, or to do so with a special device.

A tenth improvement consists in recording the kind of goods to be delivered, e.g. during step 20, and in reading and using said information specifically when, at the end of step 05, a decision is taken to make a is delivery without debiting it. This makes it possible to process resumption of the transaction using machines that are capable of delivering different types of goods or goods for different amounts, e.g. in a transport system having different destinations as a function of a selection made by the user.

What is claimed is:

1. A method of interchanging data between the non-volatile memory of a portable object and an automatic machine with which the portable object is temporarily coupled to enable goods or service to be delivered, the portable object storing in said non-volatile memory value information that can be debited by the machine in consideration for delivering the goods or service, and a ratification flag having two states, a ratified state and a non-ratified state, wherein the method comprises the successive following steps:

a) the machine reads the state of the flag and jumps to step c) if said flag is in the non-ratified state;

b) the machine issues to the portable object a command for debiting said value information by an amount corresponding to the goods or service to be delivered;

c) the portable object:

c1) records the debit by updating the value information, and c2) puts the flag into the non-ratified state, said sub-steps of recording the debit and putting the flag into the non-ratified state being performed in indivisible manner;

d) the portable object issues to the machine an acknowledgement signal indicating that the debit has been recorded;

e) the machine delivers the goods or service;

f) the machine issues to the portable object a command for setting the flag to the ratified state; and g) the portable object puts the flag into the ratified state.

2. The method of claim 1, in which performing step c1 is subordinate to a time delay elapsing since the preceding operation of putting the flag into the non-ratified state.

3. The method of claim 1, in which performing step c1 is subordinate to the machine performing the current transaction belonging to a group to which the machine that performed the preceding transaction also belongs.

4. The method of claim 1, in which, when the flag is in the non-ratified state, delivery without debit is inhibited if the machine detects that delivery took place during the preceding use of the object.

5. The method of claim 1, in which at least a portion of the information modifying the state of the object, in particular commands enabling the flag to be put into the ratified state, is previously processed by cryptographic means implemented both in the object and in the machine.

6. The method according to claim 1, in which
at least a portion of the information relating to the state of the object, in particular the state of the flag and confirmation that the debit has taken into account, is previously processed by cryptographic means implemented both in the object and in the machine.

7. The method of claim 1, in which the goods or service is delivered in deferred manner after a given time delay.

8. The method of claim 7, in which delivery takes place prior to the expiry of the time delay in the event of receiving confirmation that the object has been successful in putting the flag into the ratified state.

9. The method of claim 7, in which a pause of random duration is included in the transaction.

10. The method of claim 1, in which the information interchanged between the machine and the object is enciphered in such a manner as to avoid revealing the moment at which the machine instructs the object to put the flag into the ratified state, or the moment at which the object performs that instruction.

11. The method of claim 1, including, in the machine, counting the number of occasions on which it reads a flag in the non-ratified state.

12. The method of claim 1, including the object counting the number of occasions on which it stores the flag in the non-ratified state between two transactions.

13. The method of claim 11, in which means are provided to indicate that a given threshold has been exceeded by the count in the object, in particular means for inhibiting subsequent delivery of goods or service.

14. The method of claim 1, in which the object memory includes information about the kind of goods or service to be delivered, which information is updated before any delivery of said goods or service.

* * * * *